US008140439B2

(12) United States Patent
Olson et al.

(10) Patent No.: US 8,140,439 B2
(45) Date of Patent: Mar. 20, 2012

(54) METHOD AND APPARATUS FOR ENABLING DIGITAL RIGHTS MANAGEMENT IN FILE TRANSFERS

(75) Inventors: William L. Olson, Palatine, IL (US); Vida Ilderem, Phoenix, AZ (US); Frederick L. Kitson, Schaumburg, IL (US); Morris A. Moore, Austin, TX (US); Paul Moroney, Olivehain, CA (US); Petr Peterka, San Diego, CA (US); Theodore S. Rzeszewski, Wheaton, IL (US); Robert H. Yacobellis, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 542 days.

(21) Appl. No.: 11/739,868

(22) Filed: Apr. 25, 2007

(65) Prior Publication Data

US 2008/0270307 A1    Oct. 30, 2008

(51) Int. Cl.
*G06F 21/00* (2006.01)
(52) U.S. Cl. .............. 705/57; 705/51; 705/59; 380/201; 380/231; 726/26; 726/31; 726/32; 726/33; 713/189; 713/193
(58) Field of Classification Search .............. 705/51, 705/57, 59; 726/26, 31, 32, 33; 713/189, 713/193; 380/201, 231
See application file for complete search history.

(56) References Cited

U.S. PATENT DOCUMENTS

| | | | |
|---|---|---|---|
| 6,372,974 B1 * | 4/2002 | Gross et al. .................. 84/609 |
| 6,880,081 B1 * | 4/2005 | Itkis ........................... 713/163 |
| 7,389,273 B2 * | 6/2008 | Irwin et al. ................... 705/59 |
| 7,415,439 B2 * | 8/2008 | Kontio et al. ................ 705/53 |
| 7,444,306 B2 * | 10/2008 | Varble ........................ 705/52 |
| 7,702,590 B2 * | 4/2010 | Malik ......................... 705/59 |
| 7,809,645 B2 * | 10/2010 | Fisher et al. ................. 705/51 |
| 2002/0198851 A1 * | 12/2002 | Hashimoto et al. ......... 705/400 |
| 2003/0076955 A1 * | 4/2003 | Alve et al. .................. 380/201 |
| 2003/0120943 A1 * | 6/2003 | Hughes ...................... 713/193 |
| 2003/0159033 A1 * | 8/2003 | Ishiguro ..................... 713/156 |
| 2004/0049392 A1 * | 3/2004 | Yamada ..................... 704/273 |
| 2004/0235521 A1 * | 11/2004 | Pradhan et al. ............. 455/558 |

(Continued)

FOREIGN PATENT DOCUMENTS

WO    2005093989    10/2005

(Continued)

OTHER PUBLICATIONS

Cheun, Ngen Chong et al., "License Transfer in OMA-DRM", Computer Security—Esorics 2006 Lecture Notes in Computer Science; LNCS, Springer Berlin Heidelberg, BE, vol. 4189, Jan. 1, 2006, p. 81-96.

(Continued)

*Primary Examiner* — Mamon Obeid
(74) *Attorney, Agent, or Firm* — Stewart M. Wiener

(57) ABSTRACT

Embodiments of the invention generally provide a method and apparatus for enabling digital rights management in file transfers. One embodiment of a method for transferring digital content from a first user to a second user, includes transferring ownership of an instance of the digital content to the second user, where the instance of the digital content resides on a first device belonging to the first user. Copies of the digital content are then deleted from one or more additional devices belonging to the first user (including at least one offline device).

20 Claims, 2 Drawing Sheets

U.S. PATENT DOCUMENTS

| | | | |
|---|---|---|---|
| 2005/0071663 A1* | 3/2005 | Medvinsky et al. | 713/200 |
| 2005/0071669 A1* | 3/2005 | Medvinsky et al. | 713/200 |
| 2005/0141367 A1* | 6/2005 | Morohashi | 369/47.12 |
| 2005/0278794 A1* | 12/2005 | Leinonen et al. | 726/32 |
| 2006/0010073 A1* | 1/2006 | Fisher et al. | 705/51 |
| 2006/0085351 A1* | 4/2006 | Hug | 705/59 |
| 2006/0089917 A1* | 4/2006 | Strom et al. | 705/59 |
| 2006/0161635 A1* | 7/2006 | Lamkin et al. | 709/217 |
| 2006/0224620 A1* | 10/2006 | Silverman et al. | 707/104.1 |
| 2007/0016956 A1* | 1/2007 | Bellwood et al. | 726/26 |
| 2007/0038576 A1* | 2/2007 | Lee | 705/59 |
| 2007/0136608 A1* | 6/2007 | Kirovski et al. | 713/193 |
| 2007/0162753 A1* | 7/2007 | Nakano et al. | 713/171 |
| 2007/0169203 A1* | 7/2007 | Kim et al. | 726/26 |
| 2007/0219917 A1* | 9/2007 | Liu et al. | 705/59 |
| 2007/0240229 A1* | 10/2007 | Yoon et al. | 726/27 |
| 2007/0265977 A1* | 11/2007 | Read | 705/59 |
| 2007/0294701 A1* | 12/2007 | Banavar et al. | 718/104 |
| 2008/0027868 A1* | 1/2008 | Ljung et al. | 705/51 |
| 2008/0103977 A1* | 5/2008 | Khosravy et al. | 705/59 |
| 2008/0148414 A1* | 6/2008 | Tom | 726/29 |
| 2008/0235731 A1* | 9/2008 | Bryant et al. | 725/44 |
| 2008/0289048 A1* | 11/2008 | Jeong | 726/27 |
| 2010/0076818 A1* | 3/2010 | Peterson et al. | 705/10 |

FOREIGN PATENT DOCUMENTS

| | | |
|---|---|---|
| WO | 2007086015 | 8/2007 |

OTHER PUBLICATIONS

PCT International Search Report and Written Opinion for PCT/US2008/059827, dated Jul. 31, 2008.

European Office Action, Communication pursuant to Article 94(3) EPC for EP Patent Application No. 08745437.7, dated Aug. 6, 2010.

European Office Action, Communication pursuant to Article 94(3) EPC for EP Patent Application No. 08745437.7, dated Aug. 11, 2011.

* cited by examiner

METHOD AND APPARATUS FOR ENABLING DIGITAL RIGHTS MANAGEMENT IN FILE TRANSFERS

FIELD OF THE INVENTION

The present invention generally relates to digital media, and more particularly relates to digital rights management.

BACKGROUND OF THE INVENTION

Digital Rights Management (DRM) is an umbrella term that refers to technologies used by publishers and/or copyright owners to control access to and usage of digital data (e.g., digital music, images, text, etc.) and digital hardware (e.g., digital media players), and to restrictions associated with specific instances of digital work or devices. For example, DRM may control the number of times that a legitimate owner of a specific instance of a digital work may reproduce that instance of work for his or her own use, to control the manner in which the owner may share the instance of work with others, or to control the manner in which the owner may transfer ownership of the instance of work to another party.

For example, a first user may wish to transfer ownership of a legally purchased MPEG-1 Audio Layer 3 (mp3) music file, or of a video file, to a second user, much in the same way the first user might sell a used compact disk or digital video disk of the same work. This is also referred to as a "MOVE" (as opposed to a "COPY", which would leave the original file in place). However, the first user may have multiple copies of the mp3 or video file on various connected and disconnected devices (e.g., personal computer, personal digital assistant, digital music player, cellular telephone, etc.). Conventional methods for file transfer do not account for extra copies of transferred content, nor do they seek to eliminate these extra copies when ownership of the content changes hands. For instance, in the above example, such inability would allow the first user to transfer one copy of the mp3 or video file to the second user, while retaining any other copies for him or herself. Thus, unless the transferring party is diligent in checking all of his or her connected and unconnected devices and eliminating extra copies of the transferred content, one cannot be sure that the ownership has been transferred properly. This defeats the purposes of many policies that motivate DRM.

Therefore, there is a need in the art for a method and apparatus for enabling digital rights management in file transfers.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for enabling digital rights management in file transfers. In one embodiment, the invention syncs a user's personal electronic devices to ensure that once the user transfers digital content to another party, copies of the content are automatically eliminated from the personal electronic devices. This substantially ensures that no unauthorized copies of the content will remain on the user's devices upon transfer.

Figure 1:
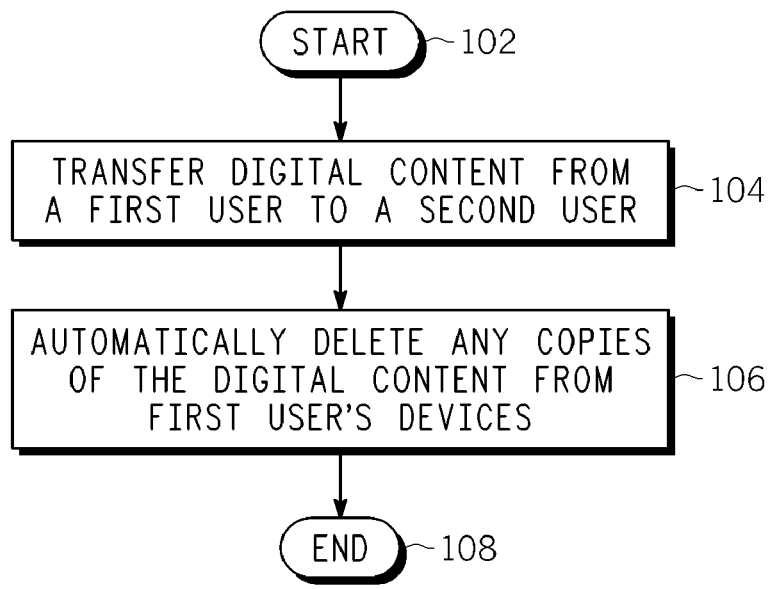
FIG. 1 is a flow diagram illustrating one embodiment of a method for enabling digital rights management, according to the present invention.

FIG. 1 is a flow diagram illustrating one embodiment of a method 100 for enabling digital rights management, according to the present invention. The method 100 may be implemented, for example, at a personal electronic device (e.g., including, but not limited to, a personal computer, a personal digital assistant, a digital music player, a cellular telephone, a personal video recorder, a digital video recorder, a digital video player, a set top box, a portable media player, a gaming console or the like).

The method 100 is initialized at step 102 and proceeds to step 104, where the method 100 transfers ownership of a specific instance of digital content (e.g., a digital music file, a digital text file, a digital image or video file, a software application, etc.) from a first user to a second user. For instance, the first user may wish to transfer ownership of a particular mp3 music file or a cellular telephone ring tone to the second user.

In step 106, the method 100 automatically deletes any copies of the digital content from synced personal electronic devices belonging to the first user (e.g., where all of the first user's devices are members of a secure home domain, such as a family domain or an authorized domain). For instance, referring back to the above example, the method 100 may delete any copies of the mp3 or ring tone residing on devices other than that from which the transferred instance of the mp3 or ring tone resided. In one embodiment, deletion of the digital content from the synced personal electronic devices is done in a manner that prevents recovery of the digital content from the devices on which the digital content was deleted (i.e., "secure" deletion). The method 100 then terminates in step 108.

Thus, the method 100 substantially ensures that copyright and ownership rights in digital media are protected and preserved in the transfer of specific instances of digital content, without requiring owners to manually search for and delete copies of the digital content. The method 100 automatically syncs an owner's personal electronic devices so that, upon transfer of an instance of digital content, copies of the content are reliably and efficiently removed without requiring any further action on the owner's part. Thus, the present invention may be considered as the digital equivalent of giving a friend a purchased compact disk for a gift: transfer of digital content and assets between two parties is enabled, while it is ensured that the transferor does not retain unauthorized copies of the content on other devices once the transfer is complete.

However, since, at the time of the transfer, not all of the synchronized devices may be "online" or connected to the transferring device, deletion on these offline devices may not occur until the next synchronization (which would occur once the offline devices connect to the transferring device). As described in further detail below with respect to FIG. 2, this issue may be addressed by transferring only partial ownership rights to the second user upon transfer of the actual digital content, and withholding full ownership rights until it can be confirmed that all copies of the digital content have been deleted from the first user's devices. In one embodiment, elimination of copies involves requiring the user of a digital device (e.g., the first user) to periodically renew his or her domain membership, at which point the transferred digital content would be deleted. If the user fails to do so, no new content will be allowed to be streamed or copied to the user's devices until the transferred digital content is purged. In a further embodiment, if the offline device does not reconnect to the domain within a predefined period of time, the offline device may refuse to play content already present on the device, forcing the user to renew the device's domain membership. Furthermore, offline devices that do not connect to the domain within the predefined period of time cannot participate in any other home domain functionality. In another embodiment, if one or more of the first user's devices never reconnects after the transfer of the digital content, the second user never gets full ownership rights.

Thus, there are three potential scenarios at the time at which the digital content is transferred: (1) all of the first user's devices are online, and the digital content can be removed from all of the devices before the digital content is transferred to the second user; (2) some of the first user's devices are offline, but the digital content will be deleted from these devices once they are online; or (3) the second user is provided with limited ownership rights in the digital content until the first user verifies complete removal of the digital content from all connected and disconnected devices.

Moreover, although the method 100 is described in terms of a method for protecting commercial copyrighted material, it is to be appreciated that the method 100 may be implemented to protect a user's personal digital media as well (e.g., the user's personal photos, documents, recordings and the like). Thus, for instance, the user may invoke the method 100 in order to transfer his or her media from an old personal computer to a new personal computer, while ensuring that no copies of the digital media remain on the old personal computer. In such a case, embodiments of the present invention support "secure" (i.e., unrecoverable) removal of the digital media, such that the digital media cannot be recovered from the old personal computer.

Figure 2:
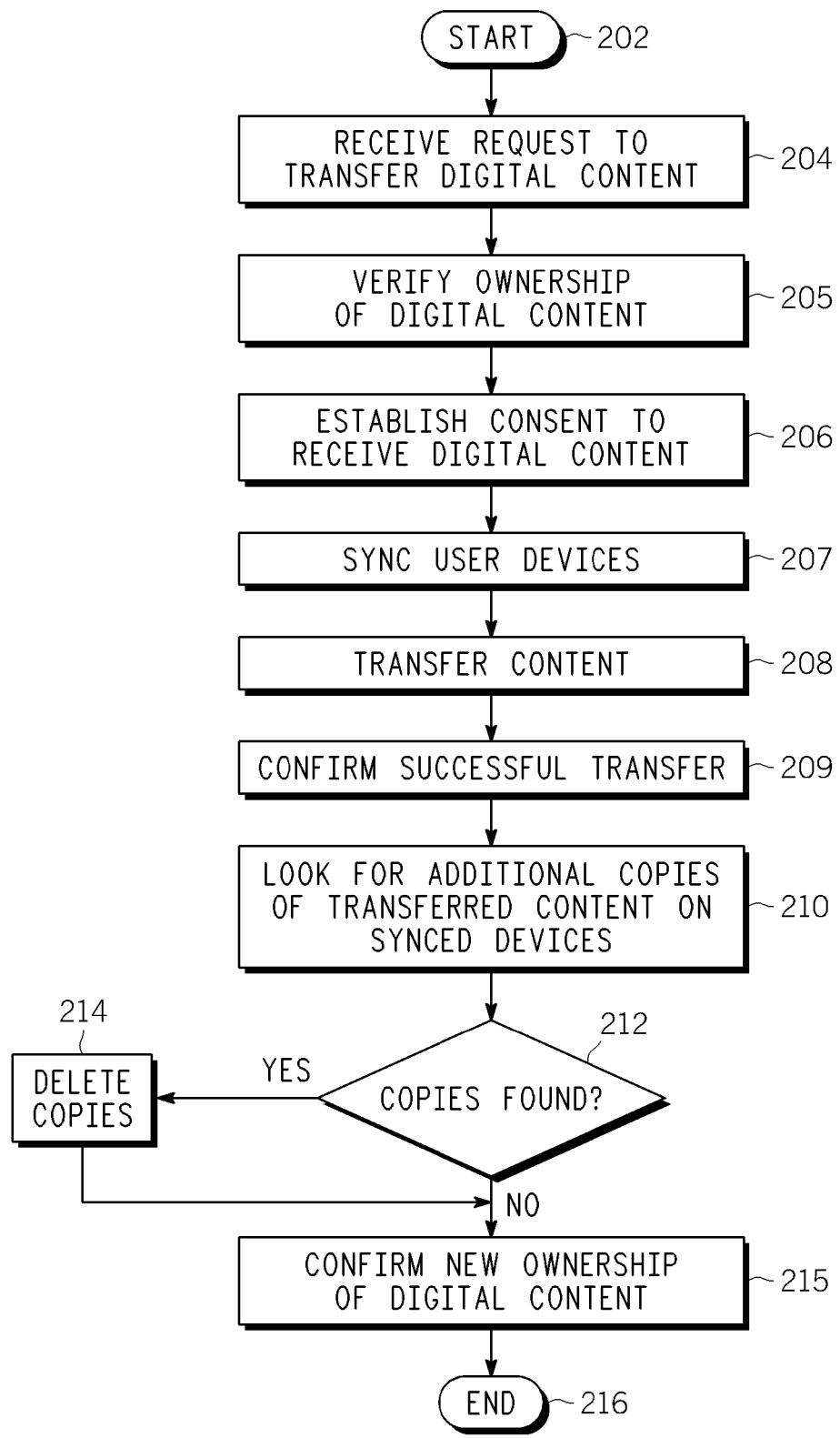
FIG. 2 is a flow diagram illustrating one embodiment of a method for enabling digital rights management, according to the present invention.

FIG. 2 is a flow diagram illustrating one embodiment of a method 200 for enabling digital rights management, according to the present invention. Specifically, the method 200 presents the high-level DRM enablement method of FIG. 1 in more detail. Like the method 100, the method 200 may be implemented, for example, at a personal electronic device (e.g., including, but not limited to, a personal computer, a personal digital assistant, a digital music player, a cellular telephone or the like).

The method 200 is initialized at step 202 and proceeds to step 204, where the method 200 receives a request to transfer digital content (e.g., a digital music file, a digital text file, a digital image or video file or the like). The request is made by the original owner of the specific instance of digital content to be transferred. In one embodiment, the request specifies a prospective new owner to whom the digital content is to be transferred. For example, the request may specify that the original owner of a legally purchased mp3 file would like to transfer ownership of the mp3 to a prospective new owner.

In step 205, the method 200 verifies ownership of the digital content to be transferred. That is, the method 200 verifies that the original owner of the digital content is a legitimate (e.g., legal) owner of the digital content, and, as such, has the power to convey ownership of the digital content to the prospective new owner. For example, in one embodiment, a third-party verification system is used to verify ownership of the digital content by the original owner. In another embodiment, ownership is tracked and/or controlled by a database. In yet another embodiment, where the rights object is bound to a particular device (or domain of devices), this verification step includes comparing the device or domain ID with an ID found in the rights object. Or, if rights are bound to a device, the possession of the unique keys to decrypt and authenticate the license verifies the ownership. In a further embodiment, a chain of certificates is verified, where the chain goes back from the current device, through any intermediary owners, and finally to the certificate authority used to sign the original rights object issued to the first purchaser.

In step 206, the method 200 establishes the prospective new owner's agreement to receive ownership of the digital content. For example, the method 200 may send a message to the prospective new owner requesting that the prospective new owner respond with his or her consent to receive ownership of the digital content.

Once the prospective new owner's agreement has been established, the method 200 proceeds to step 207 and syncs at least two of the original owner's digital devices, including at least one device on which the digital content to be transferred resides. In one embodiment, the synced devices include both connected (to a network) and unconnected (to the network) devices that rely on autosync-type functions to keep an inventory of content consistent among multiple devices. For example, the original owner of the mp3 in the above example may have three copies of the mp3, where one copy resides on each of: a personal computer, a digital music player and a cellular telephone. The personal computer, digital music player and cellular telephone would be synced together to maintain a complete list of songs legally purchased by the original owner.

In step 208, the method 200 transfers the digital content from the original owner to the prospective new owner. In one embodiment, the transfer to the new owner in step 208 includes the transfer of limited ownership rights in the digital content; full ownership rights are not transferred to the new owner until it is confirmed that the digital content has been successfully and completely transferred and is unrecoverable from the original owner's devices, as described in greater detail below. For example, the new owner's device might only be able to play back the digital content, or may only be able to provide degraded playback (e.g., lower resolution), but would not be able to share the digital content with other devices until full ownership is transferred.

The method 200 then proceeds to step 209 and confirms that the transfer of ownership was successful (i.e., that the prospective new owner has received the complete digital content and rights object to be transferred). In one embodiment, successful transfer is acknowledged or confirmed by the new owner (e.g., via a message sent by the new owner). In another embodiment, a device belonging to the new owner, to which the digital content was transferred, sends an automatic acknowledgment, if parameters of the digital content fit a template known by the device. In yet another embodiment, the recipient device opens the rights object and extracts a key needed to decrypt the digital content. The recipient device then computes a hash over the digital content and compares the hash to a value stored in the rights object. If the hash matches the stored value, then the recipient device is able to successfully decrypt the digital content and confirm that the contents are the same as when the rights object was created.

Once the transfer of ownership is complete, the method 200 proceeds to step 210 and looks for additional copies of the transferred digital content on the original owner's synced devices. In one embodiment, this search is performed in the background operations of the synced devices.

In step 212, the method 200 determines whether any additional copies of the transferred digital content were found on any of the original owner's synced devices. If the method 200 concludes in step 212 that at least one additional copy of the transferred content has been found on at least one of the original owner's synced devices, the method 200 proceeds to step 214 and automatically deletes the copies from the devices on which they reside. In one embodiment, deletion of the copies in accordance with step 212 is done in a way that ensures that the deleted digital content is not recoverable from the devices.

Once the additional copies of the transferred digital content have been deleted from the original owner's devices, the method 200 proceeds to step 215 and confirms the new ownership of the digital content. In one embodiment, confirmation of the new owner's legitimate ownership in step 215 includes transferring full ownership rights to the new owner. Thus, as discussed above, the new owner does not assume full ownership rights in the digital content until the new owner has accepted the complete digital content and the copies on the original owner's devices have been rendered unrecoverable.

The details of how ownership rights in the digital content are transferred to the new owner's device are DRM system-specific. For instance, Intellectual Property Rights Management (IPRM) sends a KEY-REQ and a KEY-REP transaction, which include a content decryption key and the rights associated with the content being transferred. This is preceded by a mutual device authentication (specific to the DRM system). In one embodiment, the original user domain management must be able to account for all disconnected devices, and confirmation in accordance with step 215 occurs only after all disconnected device have connected to the domain again. Alternatively, the original user domain must account for all copies of the original digital content that were given to portable devices, and confirmation in accordance with step 215 occurs after all devices that possessed copies of the digital content have connected to the domain again and purged the copies.

Referring back to step 212, if the method 200 alternatively concludes that no additional copies of the transferred content have been found on any of the original owner's synced devices, the method 200 proceeds directly to step 215 and confirms the new ownership of the digital content before terminating in step 216.

One potential complication includes the scenario where two portable (i.e., offline) devices owned by a first user hold copies of the digital content, and each of the portable devices transfers its copy of the digital content (i.e., to a second user and to a third user) at the same time. When the first user's portable devices later sync up with the home domain, each will delete its corresponding copy of the digital content. However, since neither device knows that the other device also transferred its copy of the digital content, two transfers resulted instead of one. If the right to transfer the digital content was limited to a transfer to one person, then this stipulation would have been violated by the multiple transfers. Thus, in one embodiment, this situation is substantially prevented by prohibiting the first user's portable devices from making transfers as a default; only the device possessing the original copy of the digital content has the right to transfer the digital content.

In order to avoid confusion, the first user should be made aware of the fact that copies of the digital content that reside on portable devices cannot be transferred. The first user should also be further made aware of the fact that, if digital content has been transferred, a copy of the digital content that resides on a portable device will likely disappear when the portable device syncs up with the home domain. In one embodiment, the first user is notified of such a deletion during the syncing process.

In yet another embodiment, a portable device may be the device from which the first user is most likely to make a transfer of digital content. In such a case, the first user may be granted the choice to give the portable device the right to transfer digital content. In one embodiment, the first user is given this choice at the time that the digital content is copied to the portable device. In one embodiment, the original device from which the digital content was copied to the portable device will lose the right to transfer the copied digital content, so that there still remains only one device capable of making transfers of the copied digital content. If the portable device then transfers the digital content, all copies of the transferred digital content will be deleted from the home domain when the portable device syncs up with the home domain.

Figure 3:
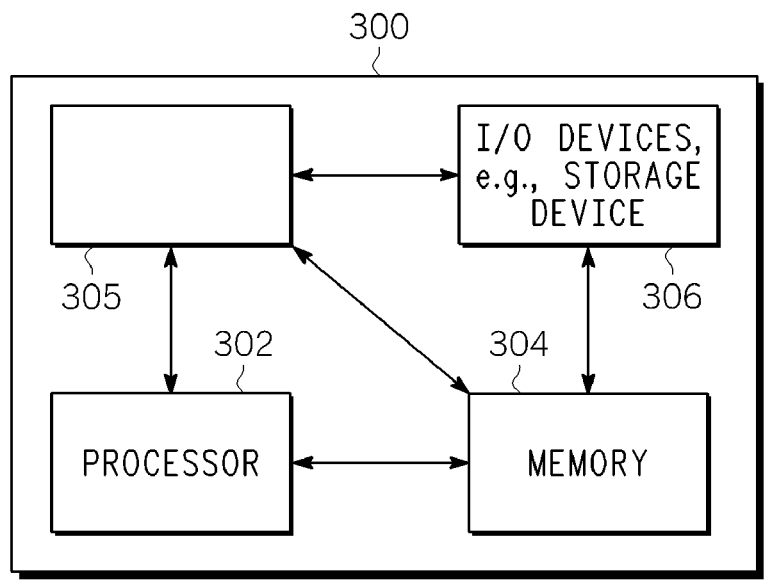
FIG. 3 is a high level block diagram of the present DRM autosync method that is implemented using a general purpose computing device.

FIG. 3 is a high level block diagram of the present DRM autosync method that is implemented using a general purpose computing device 300. In one embodiment, a general purpose computing device 300 comprises a processor 302, a memory 304, an autosync module 305 and various input/output (I/O) devices 306 such as a display, a keyboard, a mouse, a modem, a network connection and the like. In one embodiment, at least one I/O device is a storage device (e.g., a disk drive, an optical disk drive, a floppy disk drive). It should be understood that the autosync module 305 can be implemented as a physical device or subsystem that is coupled to a processor through a communication channel.

Alternatively, the autosync module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one embodiment, the autosync module 305 for eliminating copies of transferred digital media described herein with reference to the preceding figures can be stored on a computer readable medium or carrier (e.g., RAM, magnetic or optical drive or diskette, and the like).

Thus, the present invention represents a significant advancement in the field of digital media. Embodiments of the invention generally provide a method and apparatus for enabling digital rights management. In one embodiment, the invention syncs a user's personal electronic devices to ensure that once the user transfers digital content to another party, copies of the content are automatically eliminated from the personal electronic devices. This substantially ensures that no unauthorized copies of the content will remain on the user's devices upon transfer.

While the foregoing is directed to embodiments of the invention, other and further embodiments of the invention may be devised without departing from the basic scope thereof.

What is claimed is:

1. A method for transferring digital content from a first user to a second user, the method comprising:
   syncing a first device belonging to the first user and one or more additional devices belonging to the first user, to create a group of synced devices comprising the first device and the one or more additional devices;
   transferring a partial ownership of an instance of the digital content from the first device belonging to the first user to a second device belonging to the second user, the instance of the digital content residing on the first device belonging to the first user and having a first resolution, wherein the partial ownership comprises a right to render the content using a second resolution on the second device belonging to the second user;

in response to a determination that one or more copies of the digital content reside on the one or more additional devices belonging to the first user, automatically deleting, upon transferring of the partial ownership, the one or more copies of the digital content at the one or more additional devices belonging to the first user and synced to the first device, the one or more additional devices including at least one offline device, wherein deleting a copy of the digital content at the at least one offline device comprises deleting the copy of the digital content when the at least one offline device becomes online; and based upon a confirmation that no copies of the digital content reside on the one or more additional devices belonging to the first user, conveying full ownership of the instance of the digital content from the first device belonging to the first user to the second device belonging to the second user, wherein the full ownership comprises a right to render the content using at least the first resolution on the second device belonging to the second user;

wherein the partial ownership further comprises a limitation to disable the second user from copying or transferring the content to another user; and the full ownership comprises providing the second user a right to copy or transfer the content to another user.

2. The method of claim 1, wherein the automatically deleting comprises:
searching the group of synced devices for copies of the digital content; and
deleting any copies of the digital content that are found.

3. The method of claim 2, wherein the searching is performed in the background operations of the synced devices.

4. The method of claim 1, wherein the deleting comprises:
detecting when the at least one offline device is online;
searching the at least one offline device for a copy of the digital content; and
deleting the copy of the digital content, if a copy of the digital content is found.

5. The method of claim 4, wherein, until the at least one offline device has been searched and any copies of the digital content have been deleted therefrom, the at least one offline device is prevented from doing at least one of: receiving new digital content, receiving a key for existing digital content or participating in a home domain functionality.

6. The method of claim 1, wherein the digital content includes at least one of: a digital music file, a digital text file, a digital image file or a digital video file.

7. The method of claim 1, wherein the first device and the one or more additional devices include at least one of: a personal computer, a personal digital assistant, a digital video recorder, a portable media player, a digital music player or a cellular telephone.

8. The method of claim 1, wherein the one or more additional devices belonging to the first user are, by default, prohibited from transferring digital content to other devices.

9. The method of claim 1, wherein the first device belonging to the first user is an offline device that has been granted the right to transfer the digital content.

10. A non-transitory computer readable medium containing an executable program for transferring digital content from a first user to a second user, where the program performs the steps of:

syncing a first device belonging to the first user and one or more additional devices belonging to the first user, to create a group of synced devices comprising the first device and the one or more additional devices;

transferring a partial ownership of an instance of the digital content from the first device belonging to the first user to a second device belonging to the second user, the instance of the digital content residing on the first device belonging to the first user and having a first resolution, wherein the partial ownership comprises a right to render the content using a second resolution on the second device belonging to the second user;

in response to a determination that one or more copies of the digital content reside on the one or more additional devices belonging to the first user, automatically deleting, upon transferring of the partial ownership, the one or more copies of the digital content at the one or more additional devices belonging to the first user and synced to the first device, the one or more additional devices including at least one offline device, wherein deleting a copy of the digital content at the at least one offline device comprises deleting the copy of the digital content when the at least one offline device becomes online; and based upon a confirmation that no copies of the digital content reside on the one or more additional devices belonging to the first user, conveying full ownership of the instance of the digital content from the first device belonging to the first user to the second device belonging to the second user, wherein the full ownership comprises a right to render the content using at least the first resolution on the second device belonging to the second user;

wherein the partial ownership further comprises a limitation to disable the second user from copying or transferring the content to another user; and the full ownership comprises providing the second user a right to copy or transfer the content to another user.

11. The computer readable medium of claim 10, wherein the automatically deleting comprises:
searching the group of synced devices for copies of the digital content; and
deleting any copies of the digital content that are found.

12. The computer readable medium of claim 11, wherein the searching is performed in the background operations of the synced devices.

13. The computer readable medium of claim 10, wherein the deleting comprises:
detecting when the at least one offline device is online;
searching the at least one offline device for a copy of the digital content; and
deleting the copy of the digital content, if a copy of the digital content is found.

14. The computer readable medium of claim 10, wherein the digital content includes at least one of: a digital music file, a digital text file, a digital image file or a digital video file.

15. The computer readable medium of claim 10, wherein the first device and the one or more additional devices include at least one of: a personal computer, a personal digital assistant, a digital video recorder, a portable media player, a digital music player or a cellular telephone.

16. A system for transferring digital content from a first user to a second user, the system comprising:
a first device belonging to the first user, the first device comprising a processor and configured to transfer a partial ownership of an instance of the digital content from the first device belonging to the first user to a second device belonging to the second user, the instance of the digital content residing on the first device belonging to the first user and having a first resolution, wherein the partial ownership comprises a right to render the content using a second resolution on the second device belonging to the second user;

the first device further configured to sync a first device belonging to the first user and one or more additional devices belonging to the first user, to create a group of synced devices comprising the first device and the one or more additional devices;

the first device further configured to, in response to a determination that one or more copies of the digital content reside on the one or more additional devices belonging to the first user, automatically delete, upon transferring of the partial ownership, the one or more copies of the digital content at the one or more additional devices belonging to the first user and synced to the first device, the one or more additional devices including at least one offline device, wherein deleting a copy of the digital content at the at least one offline device comprises deleting the copy of the digital content when the at least one offline device becomes online; and the first device further configured to, based upon a confirmation that no copies of the digital content reside on the one or more additional devices belonging to the first user, convey full ownership of the instance of the digital content from the first device belonging to the first user to the second device belonging to the second user, wherein the full ownership comprises a right to render the content using at least the first resolution on the second device belonging to the second user;

wherein the partial ownership further comprises a limitation to disable the second user from copying or transferring the content to another user; and the full ownership comprises providing the second user a right to copy or transfer the content to another user.

17. The method of claim 1, wherein the second resolution is lower than the first resolution.

18. The method of claim 1, wherein the second resolution is the same as the first resolution.

19. The computer readable medium of claim 10, wherein the second resolution is lower than the first resolution.

20. The computer readable medium of claim 10, wherein the second resolution is the same as the first resolution.

* * * * *